UNITED STATES PATENT OFFICE.

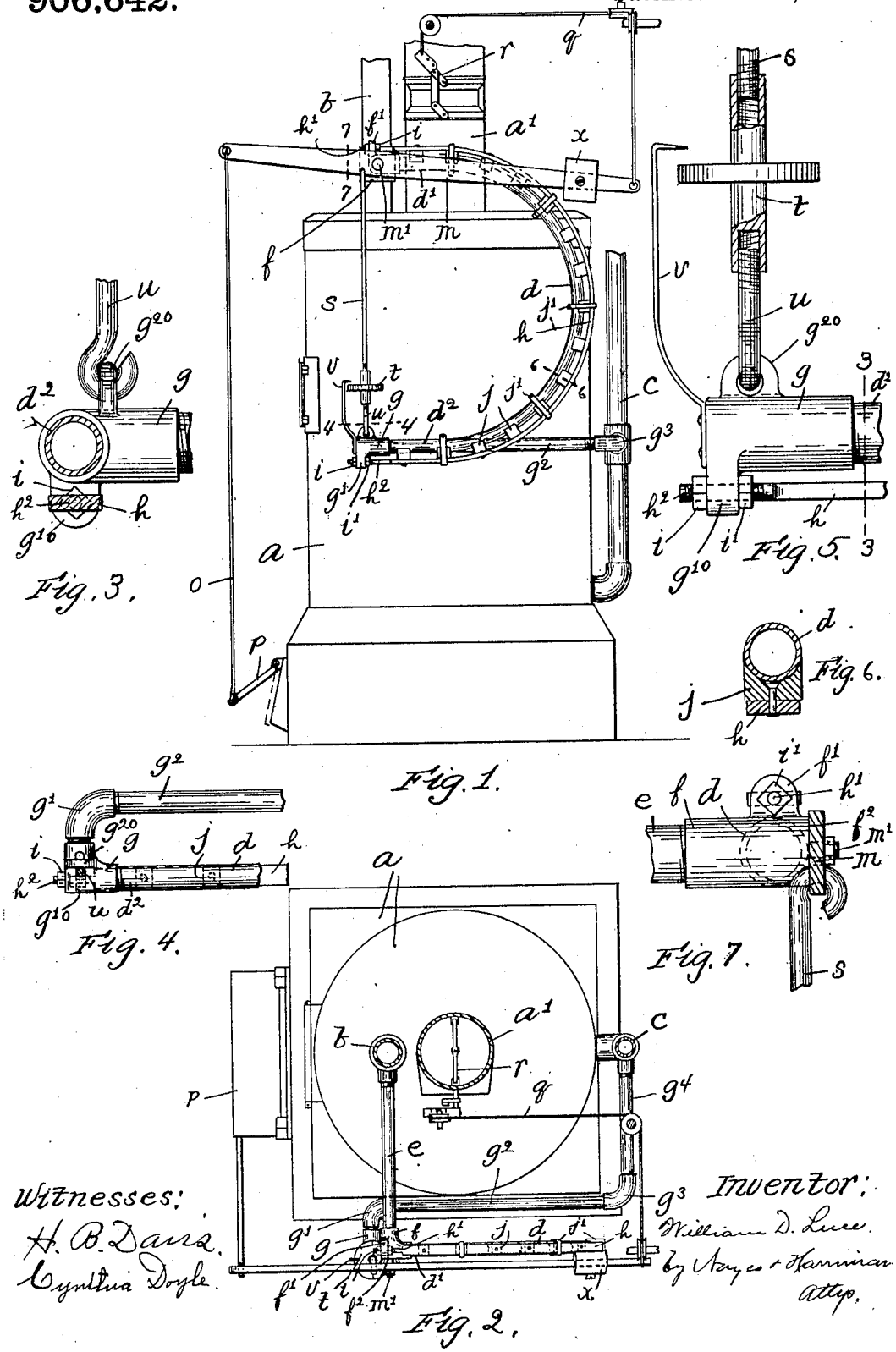

WILLIAM D. LUCE, OF HAVERHILL, MASSACHUSETTS.

DAMPER-REGULATOR.

No. 906,642.  Specification of Letters Patent.  Patented Dec. 15, 1908.

Application filed March 30, 1908. Serial No. 424,004.

*To all whom it may concern:*

Be it known that I, WILLIAM D. LUCE, of Haverhill, county of Essex, State of Massachusetts, have invented an Improvement in Damper-Regulators, of which the following is a specification.

This invention particularly relates to a draft controlling device for a water heater which is especially adapted for use in connection with a hot water heating system; although, it may be advantageously used in connection with any water heater where it is desired to maintain the water at a predetermined temperature.

In heating a building with a hot water heater, it is necessary to vary the temperature of the water according to weather conditions, and it is usually possible to tell, within a few degrees, to what temperature the water should be heated in order that the building may be heated to, and its temperature maintained at a certain point. Furthermore, small variations in temperature of the water will not, ordinarily, immediately affect the temperature of the rooms which are being heated to an appreciable extent, and while, on the other hand, if the temperature of the rooms is permitted to fall below the point at which it is desired that they be maintained, there is usually a corresponding delay in restoring the room temperature, even after the water temperature has been raised above its normal. For this reason, in heating with hot water, the room temperature may be maintained at a more nearly uniform degree by a thermostat which acts on variations in temperature of the water, than by one which acts on variations of temperature of the rooms.

The object of my invention is to provide a regulator and draft controller, of simple construction, which is adapted to be applied to any hot water heater, and which will be immediately affected by any variations in the temperature of the water in the heater.

A further object of my invention is to provide a temperature regulator which is adapted to be readily and accurately adjusted for different degrees of temperature, so that the water may be maintained at different temperatures according to weather conditions and other requirements.

I accomplish these objects by the means shown in the accompanying drawing, in which, Figure 1 is a side elevation of a hot water heater provided with my invention. Fig. 2 is a plan view thereof. Fig. 3 is a detail sectional view on line 3—3 of Fig. 5. Fig. 4 is a detail view, partly in section on the line 4—4 of Fig. 1. Fig. 5 is an enlarged view, partly in section, of the movable end of the thermostat, and the immediately connected parts. Fig. 6 is an enlarged sectional view on the line 6—6 of Fig. 1. Fig. 7 is an enlarged sectional view, on the line 7—7 of Fig. 1.

In the drawing $a$ indicates a hot water heater of ordinary construction, having a smoke pipe $a'$, a discharge or riser pipe $b$, connected to the upper end of the heater, and a return pipe $c$ connected to the lower end thereof.

According to my invention I provide a thermostatic device which comprises a pipe $d$, preferably composed of brass, or similar material having a high coefficient of expansion, said pipe being curved throughout approximately its entire length, so that it is semicircular in form. Said pipe $d$ is arranged in a vertical plane and its upper end $d'$ is connected to the riser pipe $b$ by means of a pipe section $e$ and elbow $f$, said parts all being connected by screw threads and the pipe $e$ extending at right angles to pipe $d$. The lower end $d^2$ of the pipe $d$ is connected to the return pipe $c$ by means of a pair of elbows $g$ and $g'$, connected by an intervening nipple, a pipe section $g^2$, an elbow $g^3$, and a pipe section $g^4$, all of said parts being connected by screw threads, so that they may turn with reference to each other, the pipe section $g^2$ being extended approximately parallel to the lower end portion of pipe $d$, and the section $g^4$ at right angles thereto. The upper elbow $f$ is provided with an integral lug $f'$ on its upper side and the lower elbow $g$ is provided with a corresponding integral lug $g'$ on its lower side. A flat strap $h$ is provided, which is preferably of iron, or some other material having a coefficient of expansion which is less than that of the pipe $d$, said strap being arranged to extend longitudinally of pipe $d$, about the outer curved side thereof, and having its end portion $h'$, $h^2$ reduced in width and extended through the lugs $f'$ and $g'$ respectively. A series of supports $j$ are riveted or otherwise firmly secured to the inner curved side of said strap $h$, as best shown in Fig. 6, the opposite sides of said supports from the strap being made concave to fit onto the outer curved side of the pipe d, said supports being arranged at suitable intervals, so as to hold the strap in position on the pipe and also hold it out of contact therewith. The end portions $h'$, $h^2$ of the strap $h$ are threaded to receive nuts $i$, so that when said nuts are forced against the front sides of lugs $f'$, $g'$, said supports $j$ will be pressed firmly against the curved sides of the pipe $d$. Nuts $i'$ are also threaded on said end portions $h'$, $h^2$, and clamped against the rear sides of said lugs $f'$, $g'$ after said nuts $i$ have been tightened. Said supports $j$ and the strap $h$ are preferably bound onto the pipe $d$ at several points by straps $j'$, to prevent the strap $h$ from springing away from the pipe $d$ under certain conditions. The upper elbow $f$ is provided with a projecting side face $f^2$ and a lever $m$ is pivoted thereon, by means of a pivot $m'$, with one side bearing against said face. Said lever $m$ extends forwardly and rearwardly from its pivot and is connected at its forward end, by a chain or rod $o$, to the lower draft door $p$ of the heater. The rearwardly extending end of the lever $m$ is connected by a chain $q$ to the damper $r$, arranged in the smoke pipe $a'$, said chain passing over a series of suitably arranged guide pulleys, as shown. A vertically disposed rod $s$ is pivotally connected at its upper end to the lever $m$ in front of, and closely adjacent the pivot $m'$ thereof, and the lower end of said rod is screw-threaded to receive the upper end of a coupling device $t$. The lower elbow $g$ is provided with a lug $g^2$ on its upper side and a rod $u$ is pivoted at one end in said lug $g^2$, its opposite end being screw-threaded to receive the lower end of the coupling device $t$, said rods $s$ and $u$ being arranged in alinement, and the screw-threads thereon extending oppositely, so that when the coupling $t$ is turned in one direction the rods $s$ and $u$ will be drawn together, and the connection between elbow $g$ and lever $m$ will be shortened, and when turned in the opposite direction they will be moved apart and the connection lengthened. Said coupling device $t$ is provided with a circular dial in the middle portion thereof, and a pointer $v$ is mounted on the elbow $g$, with its end in position directly over the edge portion of the dial.

The operation of the above described device is as follows:—A portion of the water which is being heated will circulate down through the pipe $d$ to the return pipe $c$, said pipe $d$ thus being heated to the same temperature as the water, and varying in temperature with the variations in temperature of the water, so that said pipe will expand or contract longitudinally as the water temperature is raised or lowered. As the strap $h$ has a smaller coefficient of expansion than the pipe $d$, it would not expand longitudinally to the same extent as pipe $d$, even if said strap were heated to the same temperature as the pipe, but the difference in extent of the relative expansion of said strap and pipe is increased by reason of the fact that said strap is held out of direct contact with the pipe $d$ by supports $j'$, so that the strap will not be raised to the same temperature as the pipe, and therefore will not even expand to an extent corresponding to the increase in temperature of the pipe. It may be stated in this connection that the supports $j$ are preferably formed of material which is a poor conductor of heat, so as to heat-insulate the strap from the pipe. As the pipe $d$ expands longitudinally the strap $h$ will, therefore, prevent its lower end $d^2$ from moving horizontally, as it otherwise would, and will draw said end down to one side of the position in which it was before the temperature was raised, decreasing the curvature of the pipe $d$ to a slight extent. As the end $d^2$ of the pipe is at some distance from the middle portion, this tendency to straighten, on the part of the pipe $d$, will result in a greatly increased movement on the part of said end. When the pipe $d$ contracts the opposite action takes place, as the pipe, by its elasticity, will tend to return to its normal position. If, however, the pipe should tend to set in its expanded position, such tendency will be overcome by the strap $h$, which will press against the rear sides of the lugs $f'$, $g'$, through the medium of the nuts $i'$, as the pipe contracts, said nuts being at all times held firmly in engagement with said lugs and the strap $h$ being prevented from springing away from the pipe by straps $j'$. To assist in the return movement I also may provide a weight $x$ on the rear end of the lever $m$, which causes an upward pull on the rod $s$, which is connected to said end $d^2$. The swinging movement of the end $d^2$ of the pipe $d$ will be permitted by the threaded connection of the elbow $g^3$ with the pipe section $g^4$, and, if necessary to permit this movement, the whole pipe $d$ may swing slightly upon the pipe $e$. The connection, however, of the pipe $d$ at its upper end $d'$ is practically stationary, while the connection at its lower end $d^2$ is movable.

The length of the arms of the lever $m$, and the pitch of the threads on the rods $s$ and $u$ are such that a single complete rotation of the dial $t'$ will move the draft controlling devices, which are connected to the lever $m$, from one extreme position to the other. In practice the parts will be adjusted so that, when the dial is set at one extreme position, and the water is at the minimum temperature to which it would ordinarily be heated, the draft will be closed or checked. If, then, it is desired to heat the water to a certain higher temperature, the dial is turned to a predetermined corresponding point, lengthening the connection between the pipe $d$ and lever $m$ and opening the draft. As the temperature of the water is raised and the pipe $d$ expands and its end $d^2$ moved downwardly, said end will draw down the connections therebetween and the lever $m$, swinging the latter in a direction to check the draft, so that, by the time the temperature of the water is raised to the desired point, the drafts will be fully checked. If the temperature of the water falls, the end portion of the pipe $d$ will be raised immediately, opening the draft to a corresponding extent. It will be apparent, therefore, that any desired temperature, within certain limits, may be secured and may be thereafter maintained, without other attention to the draft controlling devices than the mere preliminary adjustment of the dial $t$, as described.

Having thus described my invention, what I claim as new and desire to secure by Letters Patent is:—

1. A thermostatic device for water heaters comprising a curved pipe of expansible material, and a correspondingly curved strap having a coefficient of expansion less than that of said pipe, extending longitudinally thereof and connected thereto at different longitudinal points, substantially as described.

2. A thermostatic device for water heaters comprising a curved pipe of expansible material, a correspondingly curved strap extending longitudinally of said pipe, and means for connecting said strap to said pipe at different longitudinal points which hold the same out of direct contact with the pipe, substantially as described.

3. A thermostatic device for water heating furnaces comprising a pipe having a curved section of expansible material, and a strap having a smaller coefficient of expansion than that of said pipe, connected at its ends to said pipe at different longitudinal points, and embracing the curved sides thereof, substantially as described.

4. A thermostatic device for water heaters comprising a pipe having a curved section of expansible material, a strap embracing said curved section and connected thereto at its ends, and means for holding the intermediate portions of said strap out of direct contact with said pipe section, substantially as described.

5. A thermostatic device for water heaters comprising a pipe having a curved section of expansible material, a strap having a smaller coefficient of expansion than that of said pipe, extending about said curved section thereof, and connected thereto at its ends, and a series of supports mounted on said curved section of the pipe for holding the intermediate portions of said strap in position on the pipe and out of contact therewith, substantially as described.

6. A thermostatic device for water heaters comprising a pipe having a curved section of expansible material, and a flexible portion at one end of said curved section, and a strap having a different coefficient of expansion than that of the curved section of said pipe, embracing said curved section and secured to said pipe at opposite ends of said section, substantially as described.

7. In combination with a water heater, a pipe connected at its ends thereto at different elevations and having an intermediate curved section of expansible material, and a flexible portion at one end of said curved section, a strap, having a smaller coefficient of expansion than that of said curved section, connected at each end to said pipe adjacent the ends of said curved section, and a draft controlling device connected to said pipe at the side of said curved section next said flexible portion, substantially as described.

8. In combination with a water heater, a pipe having a curved section of expansible material and connections at its ends to said heater at different elevations, one of said connections being stationary and the other movable to permit one end of said curved section to swing with relation to its opposite end, a strap having a smaller coefficient of expansion than that of said curved section, said strap being connected at its ends to said pipe at opposite ends of said curved section and extending about the curved sides thereof, and an operating device connected to said pipe adjacent said movable connection, substantially as described.

9. In combination with a water heater, a pipe of expansible material having connections to the heater at different elevations, one of said connections being stationary and the other flexible to permit transverse deflection of the pipe at points adjacent said flexible connection, a strap extending longitudinally of said pipe, connected thereto at its ends and engaging the same at intermediate points to hold the same from transverse deflection at such intermediate points and to cause transverse deflection thereof at its flexibly connected end according to the linear expansion and contraction of said pipe, and a regulating device connected to said pipe at its flexibly connected end, substantially as described.

10. In combination with a water heater, a pipe of expansible material having a curved middle portion and approximately parallel end portions, said pipe having a stationary connection with said heater at one end and a flexible connection therewith at the other, a strap extending longitudinally of said pipe and connected thereto at its ends and engaging the same at intermediate points to hold the same from transverse deflection at such intermediate points and to cause transverse deflection thereof at its flexibly connected end according to the linear expansion and contraction of said pipe, and a regulating
5 device connected to said pipe at its flexibly connected end, substantially as described.

In testimony whereof, I have signed my name to this specification, in the presence of two subscribing witnesses.

WILLIAM D. LUCE.

Witnesses:
L. H. HARRIMAN,
H. B. DAVIS.